United States Patent [19]

Magee et al.

[11] Patent Number: 4,495,541
[45] Date of Patent: Jan. 22, 1985

[54] APPARATUS FOR AND METHOD OF MAKING AN ELECTRET TAPE

[75] Inventors: Mark R. Magee, Saratoga; Richard D. James, Los Altos Hills, both of Calif.

[73] Assignee: GTE Communication Products Corporation, Stamford, Conn.

[21] Appl. No.: 529,060

[22] Filed: Sep. 2, 1983

[51] Int. Cl.³ ............................................. B05C 1/04
[52] U.S. Cl. ..................................... 361/225; 307/400
[58] Field of Search ...................... 361/225; 29/592 E; 307/400; 156/273.1, 379.7, 380.3, 380.2; 430/55, 902; 179/111 E

[56] References Cited

U.S. PATENT DOCUMENTS

| | | | |
|---|---|---|---|
| 3,323,965 | 6/1967 | Hanle et al. | 156/273.1 X |
| 3,429,701 | 2/1969 | Koehler | 430/902 X |
| 4,213,168 | 7/1980 | Garbett | 361/225 |
| 4,344,810 | 8/1982 | Becker et al. | 156/379.7 |
| 4,382,196 | 5/1983 | Miller et al. | 307/400 |

Primary Examiner—Reinhard J. Eisenzopf
Attorney, Agent, or Firm—Douglas M. Gilbert

[57] ABSTRACT

Apparatus for continuously making an electret tape having an electrically conductive strip with dielectric layers on opposite sides thereof in which the tape is moved vertically in the direction of its length. A pair of opposed electrodes connected to a high voltage source and continuously wetted with a dielectric fluid contact the respective dielectric layers to electrostatically charge each layer. A second pair of identical electrodes connected to the high voltage source and the dielectric fluid supply is spaced above the other electrode pair and repeats electrostatic charging of the dielectric layers to insure uniformity of charge thereon. Fluid on the layers is dried by air blown against them as the tape emerges from the second electrode pair.

7 Claims, 4 Drawing Figures

4,495,541

APPARATUS FOR AND METHOD OF MAKING AN ELECTRET TAPE

This invention was made under contract with the Department of Defense.

RELATED APPLICATION

Ser. No. 529,067, filed Sept. 2, 1983, entitled "Apparatus for and Method of Making an Electret Tape."

BACKGROUND OF THE INVENTION

This invention relates to electret tapes and more particularly to improved apparatus for and a method of making such tapes.

U.S. Pat. No. 4,344,810 describes electret tape making apparatus in which Teflon covered layers on opposite sides of an electrically conductive strip are moved under and are electrostatically charged by a fluid saturated sponge-like electrode connected to a charging voltage. While the technique may be satisfactory at relatively low tape velocities of less than 1 centimeter per second, at higher velocities the dielectric liquid separates from the wet electrode and droplets form. As these droplets subsequently evaporate away from the electric field, electrostatic charges on the dielectric layer recombine under the droplets and form dead spots or voids, resulting in a defective electret tape.

This invention is directed to a solution of this problem.

OBJECTS AND SUMMARY OF THE INVENTION

A general object of this invention is the provision of apparatus for continuously making electret tape at substantially increased tape velocities.

Another object is the provision of an improved method of making electret tape at higher tape velocities with uniformly charged electret layers.

These and other objects of the invention are achieved with apparatus and a technique in which an elongated tape having dielectric layers on opposite sides of the conductive strip is moved in a substantially upright plane between a pair of opposed energized electrodes wetted by a dielectric fluid. In a preferred embodiment, a second pair of such electrodes is vertically spaced above the other pair and the fluid on the dielectric layer is dried as the tape exits from the upper electrode pair while still in the electric field thereof.

DESCRIPTION OF PREFERRED EMBODIMENT

Figure 1:
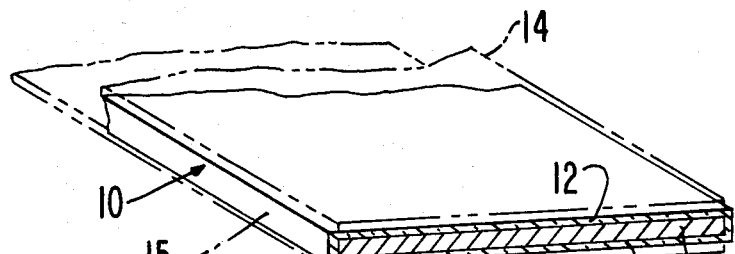
FIG. 1 is a perspective view of a portion of a double-sided electret tape with which this invention is concerned.
Figure 2:
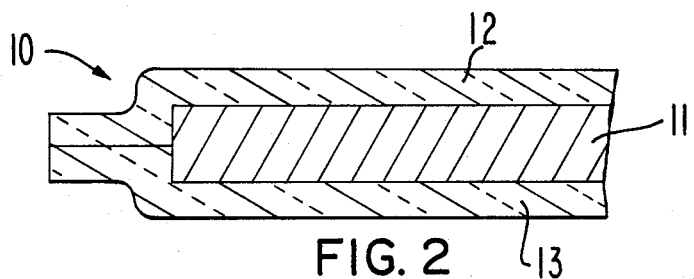
FIG. 2 is an enlarged view of part of the tape shown in FIG. 1.

Referring now to the drawings, FIGS. 1 and 2 illustrate an electret tape 10 having an electrically conductive strip 11 made of copper or the like and dielectric layers 12 and 13, preferably FEP (fluorethylenepropylene) Teflon, bonded to opposite sides of strip 11. In practice, a sheet of Teflon is wrapped completely around strip 11 as shown in FIG. 2 to fully insulate it although only the two layers 12 and 13 are charged to form electrets. In order to convert electret tape 10 into a transducer, two outer conductive strips 14 and 15, shown in broken lines in FIG. 1, are secured as by plastic tape or the like to dielectric layers 12 and 13, respectively, after the latter have been electrostatically charged. As a transduceer, this tape assembly may function as an ultrasonic bidirectional transmitter when an ac voltage at ultrasonic frequencies is applied between inner strip 11 and outer strips 14 and 15, the latter vibrating to produce ultrasonic waves that propagate outwardly in opposite directions from the tape. When the tape is used as a receiver, ultrasonic waves incident on outer strips 14 and/or 15 generate an ac signal at the ultrasonic frequency between inner strip 11 and outer strips 14 and 15.

This transducer principle is more completely described in U.S. Pat. No. 4,382,196 and is useful, for example, as a line sensor in intrusion detection systems. This invention is concerned with the electrostatic charging of dielectric layers 12 and 13 bonded to strip 11, and does not describe the formation of these components with strips 14 and 15 into a complete bidirectional transducer. In the following description and in the claims, the terms "tape" and "electret tape" mean the three-element structure of strip 11 and dielectric layers 12 and 13.

Figure 4:
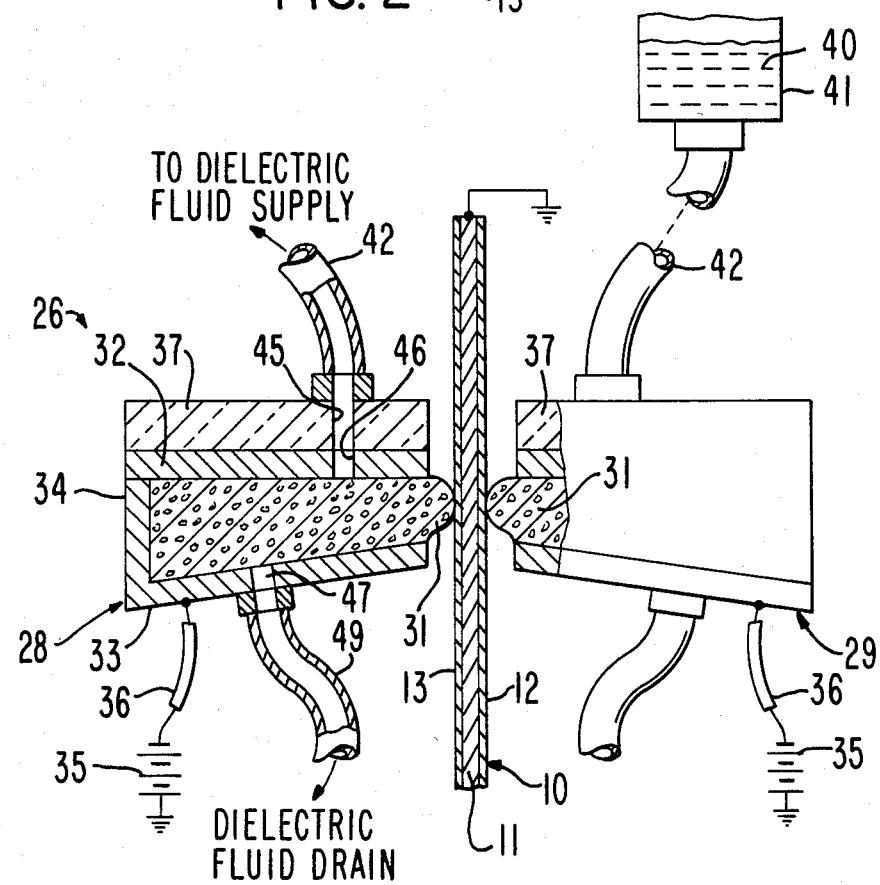
FIG. 4 is an enlarged view, partly in section, of one of the electrode assemblies of FIG. 1 showing details of construction.
Figure 3:
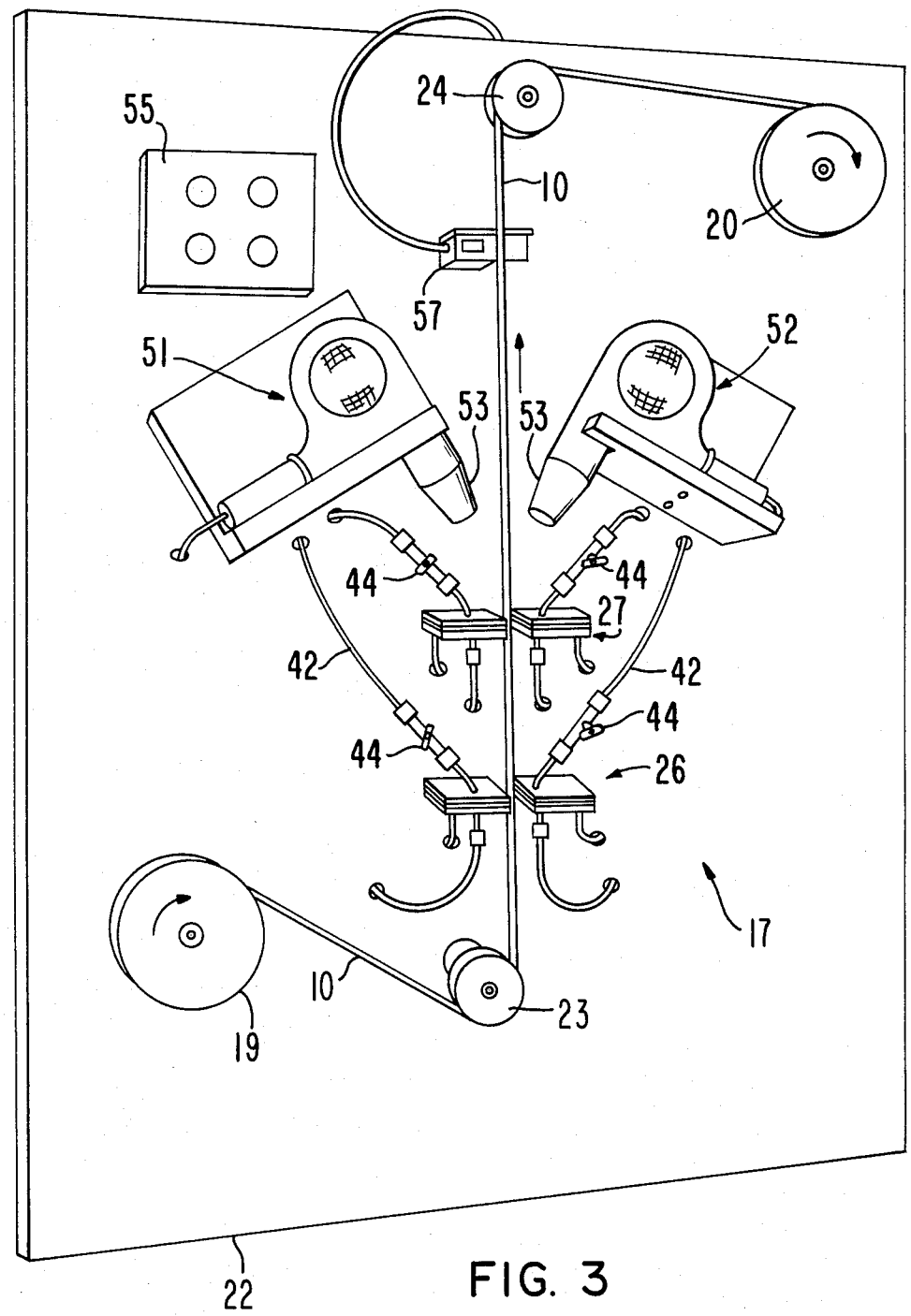
FIG. 3 is a perspective view of electret tape making apparatus embodying the invention.

Apparatus 17 for making tape 10 and embodying the invention is shown in FIG. 3 and comprise a supply reel 19 on which is wound tape with uncharged dielectric layers 12 and 13 and a take-up reel 20 on which charged tape 10 is wound. Reels 19 and 20 are mounted on a vertically extending plane base 22 for rotation in the directions of the arrows so that tape 10 passes from reel 19 over sheave 23 and upwardly to sheve 24 from which it extends to reel 20. Tape 10 is moved from sheave 23 upwardly in the direction of the arrow by reel 20 which is rotated by a motor, not shown. Strip 11 is electrically grounded as indicated in FIG. 4 by connection of the exposed lead end to the grounded hub of reel 20. The tape between sheaves 23 and 24 is in a plane that is 90°±10° with horizontal and preferably is vertical.

Tape 10 is electrostatically charged preferably by two substantially identical, vertically spaced charging stations 26 and 27 adjacent to the vertical portion of tape 10 between sheaves 23 and 24. Since the structures of charging stations 26 and 27 are identical, only station 26 will be described herein, like reference characters indicating like parts on the drawing.

Station 26 comprises two substantially identical electrode assemblies 28 and 29, see FIG. 4, on opposite sides of tape 10, each having a horizontally disposed sponge-like electrode 31 made of a synthetic open-hole foam material secured tightly between electrically conductive plates 32 and 33 electrically connected together by plate 34 and to a source 35 of high dc voltage, typical −800 volts by lead 36. Protective cover 37 of insulating material mounted on base 22 covers the electrically hot components of the assembly for operator safety.

Dielectric fluid 40 is fed by gravity from a supply container 41 to each electrode 31 by tube 42 through an adjustable fluid control valve 44, see FIG. 3, via apertures 45 and 46 in cover 37 and plate 32, respectively, at the portion of the electrode proximate to the tape. The quantity of fluid fed to each electrode is determined by operation of valve 44. Excess fluid in the electrode is removed through aperture 47 in lower plate 33 by a drain tube 49 connected to a reservoir, not shown. Electrodes 31 of assemblies 28 and 29 make opposed wiping contacts with dielectric layers 12 and 13, respectively, of tape 10 and electrostatically charge those layers through fluid 40 in the electrodes.

The second charging station 27 is vertically spaced above station 26 and has the same structure and function as the latter in order to insure complete and uniform charging of tape layers 12 and 13. The flow of dielectric fluid to the electrodes of upper station 27 preferably is less in lower station 26 in order to prevent separation of the fluid from the electrodes before drying. In other words, the degree of wetness of each electrode in upper charging station 27 is such that with a given velocity of the moving tape and the pull of gravity on the liquid on the tape, the liquid does not separate from the electrodes prior to drying on the tape. In order to further insure that this condition is met, air blowers 51 and 52 are supported on base 22 above upper charging station 27, each blower having a nozzle 53 for directing heated air on layers 12 and 13 at the tape exit side of upper electrodes 31. A blower control panel 55 on base 22 permits adjustment of blower air velocity and temperature.

An electrostatic charge meter 57 is supported on base 22 interchangeably adjacent to either side of the tape above upper charging station 27 for monitoring the charge on dielectric layers 12 and 13.

In operation, tape 10 with uncharged dielectric layers 12 and 13 is unwound from supply reel 19, by power driven take-up reel 20, is moved into a vertical path around sheave 23 and passes upwardly between and into engagement with opposed electrodes 31 of lower charging station 26. The gravity fed dielectric liquid 40 wets thoroughly the inner or tape ends of electrodes 31 and the dc voltage on the electrodes electrostatically charges the layers. Some fluid remains on the dielectric layers as the tape moves from the lower to the upper charging station and wets the lower or tape entry side of the electrodes of upper station 27. The degree of wetness of lower station electrodes together with the velocity of the tape are controlled to achieve this objective.

As the tape passes between electrodes 31 of upper station 27, charged dielectric layers 12 and 13 are subjected to an additional electrostatic charging which insures completeness and uniformity of the charge thereon. The air flow against the exit sides of the tape facilitate drying of the liquid prior to separation from the electric field of the electrodes. The fully charged tape then passes to take-up reel 20 where it is stored for further processing into a bidirectional transducer.

The tape making apparatus described above has been built and successfully tested in continuously producing electret tape under operating condition and with the results as follows:

| Tape 10: | |
| --- | --- |
| Width | 1 7/16" |
| Strip 11: | |
| material | copper |
| thickness | .001" |
| width | 1" |
| Layers 12, 13: | |
| material | FEP Teflon |
| thickness | .002 to .005" |
| width | 1 3/8" |
| Velocity | 2"/sec. |
| Fluid 40: | |
| Composition | 70% Ethanol/ 20% Methanol/ 10% Acetone |
| Space between stations 26, 27 | 8 to 12" |
| Final charge on layers 12, 13 | 800 Vdc |

What is claimed is:

1. Apparatus for making a composite electret tape having an elongated electrically conductive strip and a dielectric layer on one side of said strip, comprising:
   a supply reel for winding thereon said tape with an uncharged dielectric layer;
   a take-up reel for winding thereon said tape with charged dielectric layers;
   means for moving said tape from the supply reel to the take-up reel such that part of said tape moving between the reels is disposed in a plane at an angle of 90°±10° with horizontal; and
   an electrostatic charging assembly for charging the dielectric layers disposed adjacent to said part of the tape comprising:
   a pair of sponge electrodes disposed on opposite sides of said plane and positioned to receive the dielectric layers, respectively, across the full widths thereof;
   a supply of dielectric fluid connected to the top of each of said electrodes for wetting same;
   a drain for excess dielectric fluid connected to the bottom of each of said electrodes;
   means for grounding said strip; and
   a source of high dc voltage connected to said electrodes whereby said dielectric layers are simultaneously electrostatically charged.

2. Apparatus according to claim 1 in which said charging assembly has an air blower adjacent to each side of said plane and disposed to blow air on the proximate dielectric layer at the exit side therof from said electrode for drying said fluid.

3. Apparatus according to claim 1 in which said charging assembly has a second pair of said electrodes adjacent to opposite sides of said plane and positioned to receive said dielectricc layers, respectively, said second pair of electrodes being identical to said first pair and being similarly connected to said voltage source and to said fluid supply and to said fluid drain, said second pair of electrodes being spaced below said first pair.

4. Apparatus according to claim 1 in which said part of said tape is in a vertical plane.

5. Apparatus for making a composite electret tape having an elongated electrically conductive strip and a dielectric layer on each of the opposite sides of the strip, comprising:
   means for moving said tape in the direction of its length in a plane disposed at an angle of 90°±10° with horizontal; and
   an electrostatic charging assembly adjacent to said plane comprising:
   a first pair of sponge electrodes disposed on opposite sides of said plane and positioned to receive the dielectric layers, respectively;
   a supply of dielectric fluid connected to the top of each of said electrodes for wetting same;
   a drain for excess dielectric fluid connected to the bottom of each of said electrodes;
   means for grounding said strip; and a source of high dc voltage connected to said electrodes whereby said dielectric layers are simultaneously electrostatically charged.

6. The apparatus according to claim 5 with means for drying said dielectric layers at the exit side of said electrodes.

7. The apparatus according to claim 6 with a second pair of said electrodes adjacent to opposite sides of said plane and positioned to receive said dielectric layers, respectively, said second pair of electrodes being identical to said first pair and being similarly connected to said voltage source and to said fluid supply and to said fluid drain, said second pair of electrodes being spaced below said first pair.

* * * * *